(12) United States Patent
Elgindi

(10) Patent No.: US 7,862,755 B2
(45) Date of Patent: Jan. 4, 2011

(54) CONSTANT SHEAR RATE EXTRUSION DIE

(76) Inventor: Mohamed B. Elgindi, 118 Grey Friar La., Eau Claire, WI (US) 54701

( * ) Notice: Subject to any disclaimer, the term of this patent is extended or adjusted under 35 U.S.C. 154(b) by 102 days.

(21) Appl. No.: 12/206,925

(22) Filed: Sep. 9, 2008

(65) Prior Publication Data

US 2010/0059903 A1    Mar. 11, 2010

(51) Int. Cl.
*B29C 47/14* (2006.01)
(52) U.S. Cl. .............. 264/176.1; 425/133.5; 425/376.1; 425/461; 425/466
(58) Field of Classification Search ............ 425/133.5, 425/192 R, 376.1, 381, 461, 466; 264/176.1
See application file for complete search history.

(56) References Cited

U.S. PATENT DOCUMENTS

| | | | |
|---|---|---|---|
| 4,043,739 A | | 8/1977 | Appel |
| 4,285,655 A | | 8/1981 | Matsubara |
| 4,372,739 A | * | 2/1983 | Vetter et al. .................. 425/466 |
| 5,292,463 A | * | 3/1994 | Paul ........................... 264/40.6 |
| 5,494,429 A | | 2/1996 | Wilson |
| 6,057,000 A | | 5/2000 | Cai |
| 7,056,112 B2 | | 6/2006 | Ulcej |

OTHER PUBLICATIONS

H.H. Winter et al., Design of Dies for the Extrusion of Sheets and Annular Parisons: The Distribution Problem, Polymer Engineering and Science, Apr. 1986, vol. 29, No. 8.
Rauwendaal, C., The basics of flat-die design, Plastics World pp. 61-63, (Apr. 1991).

* cited by examiner

*Primary Examiner*—Joseph S Del Sole
*Assistant Examiner*—Robert Dye
(74) *Attorney, Agent, or Firm*—Kagan Binder, PLLC

(57) ABSTRACT

An extrusion die for extruding thermoplastic materials to produce a sheet of substantially uniform thickness, the extrusion die having a manifold width that increases from the centerline toward the die exit or lip. The increasing width manifold arms, with the preland portion, provide a constant shear rate at all areas of the die and a constant residence time, so that every fluid particle path through the die has the same residence time. By having the increasing width manifold arms, the preland area of the extrusion die is decreased, usually by about 30%, often about 40-60%, compared to a Winter die, thus decreasing clam-shelling effect and allowing design and extrusion of wider sheets.

21 Claims, 4 Drawing Sheets

CONSTANT SHEAR RATE EXTRUSION DIE

BACKGROUND

An extrusion die is the part of an extrusion line or process responsible for shaping extrudable material (typically molten thermoplastic material) into a desired shape with the desired dimensions, usually as a sheet, film, curtain, pipe, or other elongate article.

Thermoplastic sheets are extruded by extrusion dies often referred to as "flat extrusion dies." These dies include an inlet that receives an extrudable fluid material (typically molten thermoplastic material) that joins to a manifold expanding laterally to the width of the extruded sheet. The manifold joins a preland portion having a height that reduces gradually to the ultimate required thickness of the extrudate.

The manifold cavity and the preland heights and lengths are chosen in order to balance the pressure and velocity of the molten material as it exits the die. To determine the internal die dimensions of the manifold and preland portion, to obtain the required pressure and velocity balance, one needs to solve the flow equations, including the material equation, which relate the material viscosity and shear rate. A die that is balanced for a certain material may not be balanced for a different one.

A solution for a balanced die independent of the molten material was introduced by H. H. Winter and H. G. Fritz in 1984, and is referred to as the "Winter die." The Winter design provides a constant shear rate throughout the die; that is, the shear rate is the same at each internal point in the Winter die. The Winter die design also provides a constant residence time throughout the die, so that the residence time for a particle flowing through the die is the same as that of a particle travelling straight through at the die centerline. Based on this, the Winter die design allows the extrusion of any material though the Winter die without affecting the die balance. The Winter die, however, could be improved.

BRIEF SUMMARY

The present disclosure relates to extrusion apparatus and more particularly to an extrusion die for extruding thermoplastic materials to produce a sheet or film of substantially uniform thickness. In general, the extrusion die of the present invention has a manifold width that increases from the centerline toward the die exit or lip. The increasing width manifold arms, together with the preland portion of the die, provide a constant shear rate at all areas of the die. Additionally, the increasing width manifold arms, together with the preland portion, provide a constant residence time in the die. By having the increasing width manifold arms, the preland area of the extrusion die is decreased compared to Winter die designs, usually by about 30%, often about 40-60%, thus decreasing the pressure drop through the preland area and decreasing the clam-shelling effect. These design features allow extrusion of wider sheets. The die of the present invention is balanced to be insensitive to viscosity changes, so that it can be used with essentially any extrudable molten material without having to reconfigure the die.

In one particular embodiment, this invention is directed to an extrusion die having a first body half and a second mating body half, which when mated together define a die inlet, a die exit, and a cavity in fluid communication with the die inlet and the die outlet. The die cavity includes a manifold having a width defined by a back line and a preland back line. At least a portion of the back line is nonparallel to the die exit, and the width of the manifold increases from the die inlet toward the die exit.

In another particular embodiment, this invention is directed to an extrusion die having a first body half and a second mated body half having a die inlet, a die exit, and a cavity in fluid communication with the die inlet and the die outlet. The die cavity includes a manifold having a centerline, a back line with at least a portion of the back line nonparallel to the die exit, a preland back line, and first and second arms each extending from the centerline to a terminus end. Each manifold arm has a width defined by the back line and the preland back line, with the width of each manifold arm increasing from the centerline to its terminus end.

In some embodiments, the entire back line is nonparallel to the die exit. At least a portion of the back line may be arcuate, or the entire back line may be arcuate. The preland back line may be arcuate. In some embodiments, the width of the manifold or of each manifold arm increases linearly or nonlinearly. The manifold or each manifold arm may have a height that decreases linearly or nonlinearly from the die inlet toward the die exit.

In another particular embodiment, this invention is directed to a method of extruding molten material through an extrusion die that has a die inlet, a die exit, and a cavity in fluid communication with the die inlet and the die outlet, wherein the die cavity comprises a manifold having a centerline and first and second arms each extending from the centerline to a terminus end, each manifold arm having a width increasing from the centerline to its terminus end. The manifold joins a preland portion. The method includes inputting molten material via the inlet to the manifold, the molten material having a constant shear rate throughout the die, and obtaining an extrudate from the die exit. The molten material also has a constant residence time within the die.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration at least one specific embodiment. It is to be understood that other embodiments are contemplated and may be made without departing from the scope or spirit of the present disclosure. The following detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The present disclosure relates to extrusion dies that have a manifold and preland portion that together provide a constant shear rate across the width of the die, and at any given point along the wall defining the cavity of the die. This invention is directed to extrusion dies that have manifold arms that increase in width from the manifold centerline to the exit. The height of the manifold may decrease from the manifold centerline to the exit. These features provide an extrusion die that requires a shorter preland area, often by about 40% compared to conventional designs of the Winter die, thus allowing design and extrusion of wider sheets. The features of this invention also provide extrusion dies that have a lower pressure drop. While the present disclosure is not so limited, an appreciation of various aspects of the disclosure will be gained through a discussion of the examples provided below.

Figure 1:
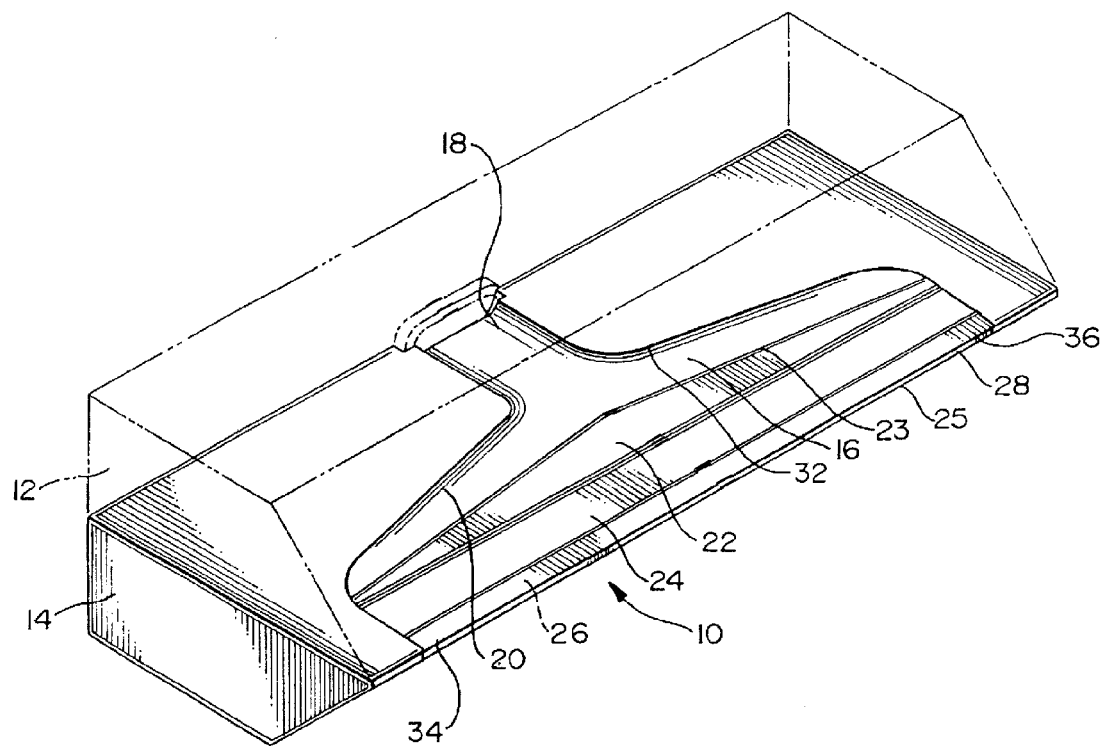
FIG. 1 is perspective view, partially in phantom, of a prior art extrusion die apparatus.
Figure 2:
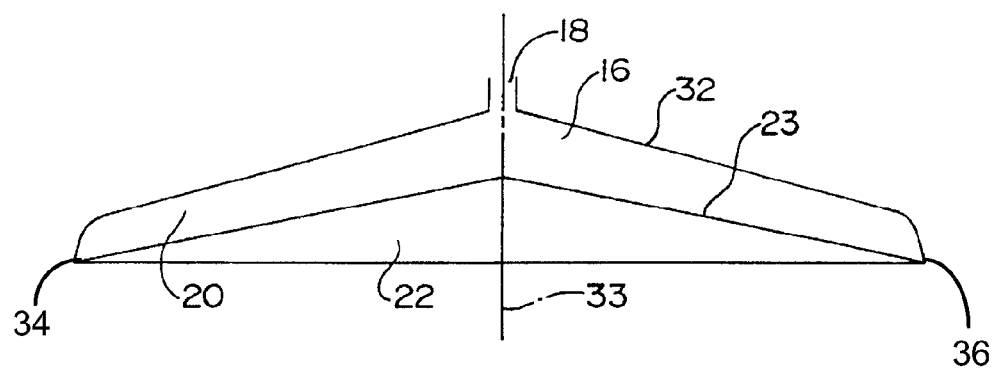
FIG. 2 is a schematic plan view of one of the die halves of the prior art apparatus of FIG. 1.

FIGS. 1 and 2 illustrate a prior art extrusion die 10 includes an upper die half 12 and a lower die half 14, which are assembled together to form a cavity 16 including an inlet 18, a manifold 20, and a preland portion 22 having a preland back line 23. Cavity 16 includes a preland extension 24 between preland portion 22 and a gap or die exit 25 disposed between a lip 26 of upper die body half 12 and a lip 28 of lower die body half 14.

As is conventional in the extrusion art, the "length" of cavity 16 is the distance from back line 32 to die exit 25. The "length" of preland portion 22 is the distance from preland back line 23 to preland extension 24. The "width" of cavity 16 is the distance between ends 34, 36, whereas the "width" of manifold 20 is the distance between back line 32 and preland back line 23. The "height" of manifold 20, preland portion 22 or of cavity 16 is the distance between the walls of upper die body half 12 and lower die body half 14 in the area of manifold 20, of preland portion 22 or of cavity 16, respectively.

Prior art extrusion die 10 is used to extrude molten thermoplastic material through die exit 25 to form a film or sheet product. Manifold 20 of prior art extrusion die 10 has a conventional "coat-hanger" shape wherein cavity 16 has a length extending from back line 32 to die exit 25. This length is greatest along a centerline 33 of die 10 and decreases substantially linearly toward either end 34, 36 of die 10 over a majority of the width of die 10. In this embodiment, back line 32 and preland back line 23 are both linear. Other prior art coat-hanger extrusion dies have a back line and a preland back line that are curved; see U.S. Pat. No. 4,285,655, for example. In some embodiments, coat-hanger dies with a linear back line and preland back line are referred to as "fishtail" dies. In most of these die designs, the width of manifold 20 (i.e., from back line 32 to preland back line 23) decreases from centerline 33 toward either end 34, 36.

Another type of prior art extrusion die, commonly referred to as a "horseshoe" or "Winter" die has a rectangular manifold cross-section with constant width and varying height. The Winter die has a preland length at the center of the die which increases as the square root of half its width. This design allows for the equal shear rate at each internal point of the Winter die. Based on this constant shear rate, a Winter die can be used to extrude any molten material without the need to redesign the cavity and manifold dimensions.

Figure 3:
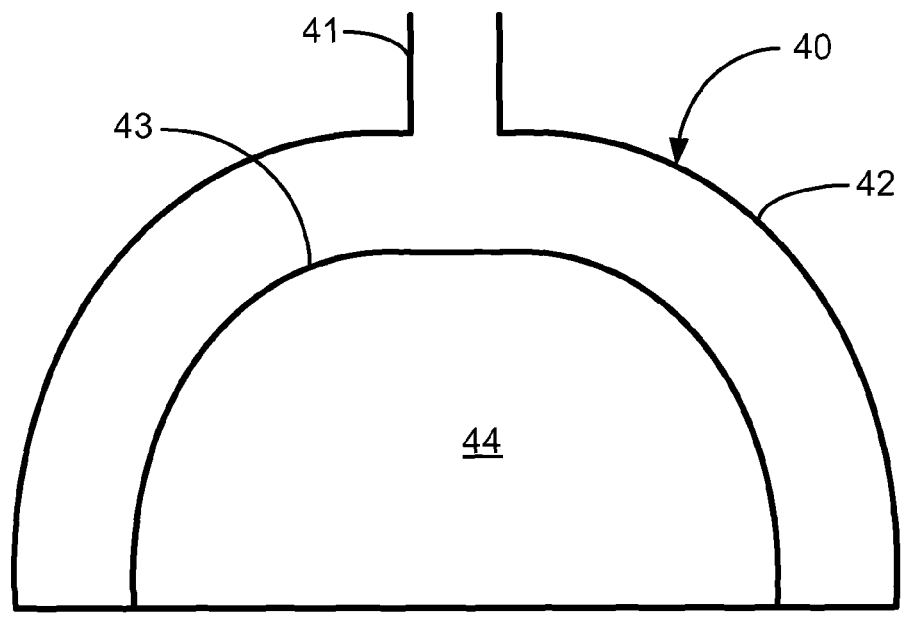
FIG. 3 is a schematic plan view of a half of an embodiment of a prior art Winter extrusion die.
Figure 4:
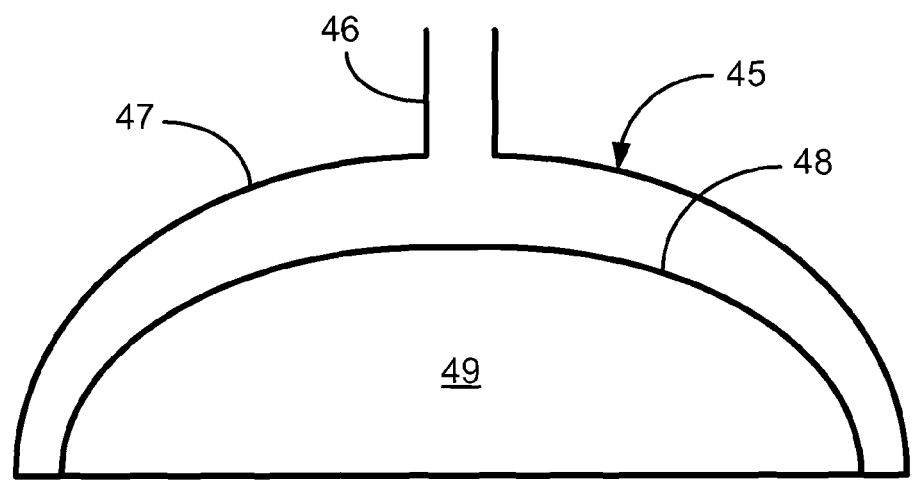
FIG. 4 is a perspective view of a half of a second embodiment of a prior art Winter extrusion die.

FIGS. 3 and 4 illustrate two embodiments of Winter dies; these designs are similar to FIG. 12, Version I and Version II, from the article by H. H. Winter and H. G. Fritz, "Design of dies for the extrusion of sheets and annular parisons: the distribution problem", Polymer Engineering and Science, Vol. 26, No. 8 (April 1986) 543-553. Both designs have a manifold and preland that provide a constant shear rate throughout the die.

FIG. 3 illustrates manifold 40 having an inlet 41 thereto, manifold 40 defined by back line 42 and preland back line 43. Downstream of preland back line 43 is preland portion 44. The width of manifold 40, between back line 42 and preland back line 43, is constant along the length of manifold 40. FIG. 4 illustrates manifold 45 having an inlet 46 thereto, manifold 45 defined by back line 47 and preland back line 48. Downstream of preland back line 48 is preland portion 49. The width of manifold 45, between back line 47 and preland back line 48, decreases along the length of manifold 45.

Whether a coat-hanger die, a fishtail die, or a Winter die, due to the high pressure of the extrudable material within the die block, the two halves of the die block (e.g., halves 12, 14) deflect outward as the material passes through, creating a thicker extrudate at the center line (e.g., at centerline 33) than at the edges (e.g., at edges 34, 36). This phenomenon is called "the clam-shelling phenomenon." The clam-shelling problem worsens as the length of the preland portion at the center of the die increases, because the deflection increases with the preland length to the fourth power. Furthermore, an increased length of the preland portion at the center of the die increases residence time in that region and may cause the material to chemically degrade and result in defective product. This restricts the use of many dies, particularly the Winter die, to the production of products of small width and for extruding materials that are less sensitive to temperature variation.

The extrusion dies of this invention have advantages over Winter die designs, in that the preland depth can be shortened by at least about 30%, often about 40-60% to obtain the same extrudate width. The extrusion dies of this invention allow the manufacturing of wider uniform shear rate dies, by reducing the undesirable clam-shelling phenomenon.

Figures 5, 5A:
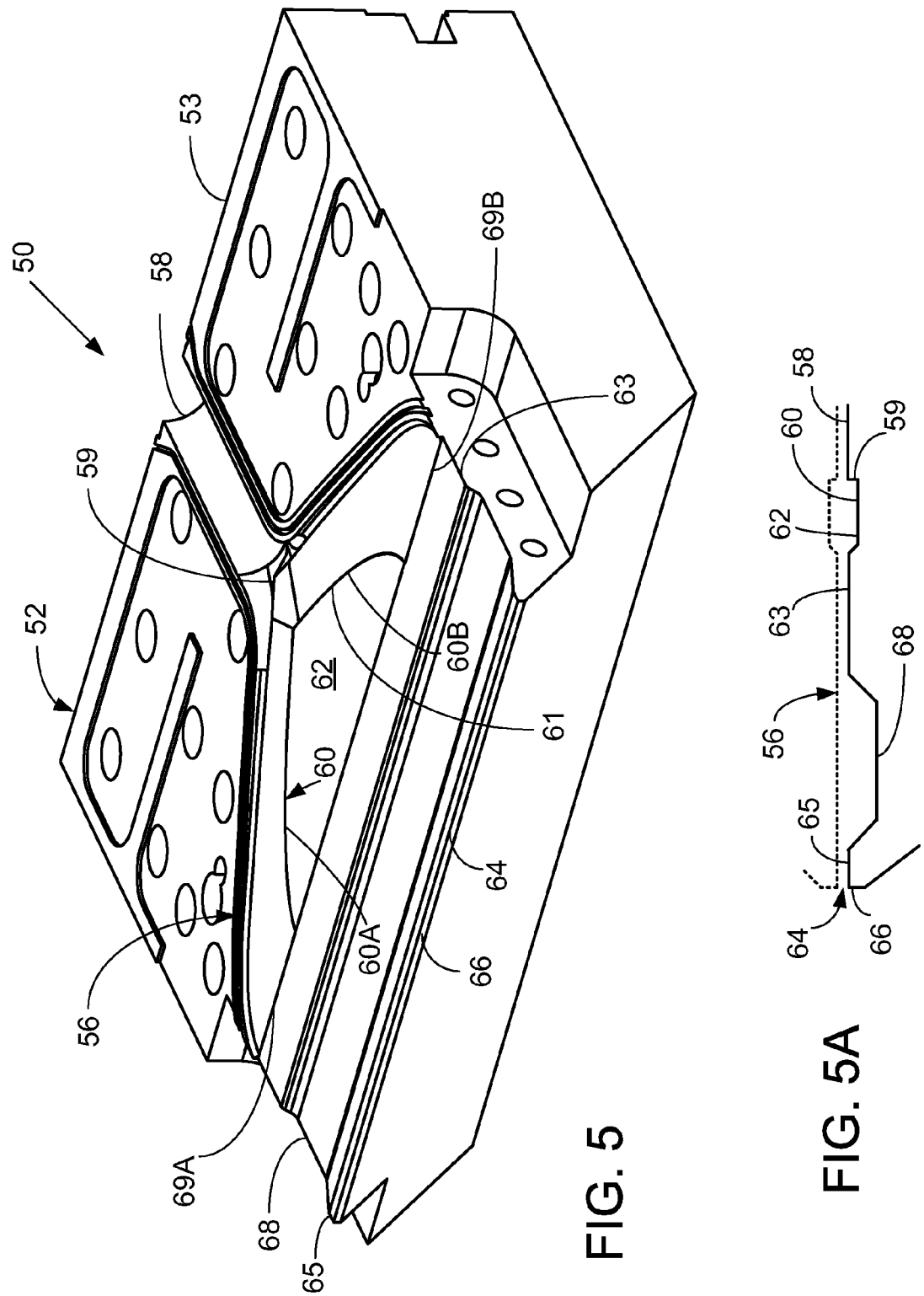
FIG. 5 is a perspective view of a half of an extrusion die apparatus according to this invention.
FIG. 5A is a schematic side view of a cavity of the extrusion die apparatus of FIG. 5.

Referring now to FIG. 5, an extrusion die 50 in accordance with the present invention is illustrated. Illustrated in FIG. 5 is only lower die body half 52; an upper die body half would also be present, but is not illustrated here for clarity. The upper die body half may be a mirror image of the lower die body half or may differ. The upper and lower die body halves are typically joined together by a plurality of bolts received in corresponding holes in the upper and lower die body halves, usually extending across the back of the halves. A back edge 53 of die body half 52 is identified in FIG. 5. Lower die body half 52 and the upper die body half together define a cavity 56 that includes an inlet 58 communicating with an inlet end 59 of a manifold 60 and a preland portion 62.

Cavity 56 is in fluid communication with a gap or die exit 64 extending along the width of the extrusion die 50 between a lip 66 of lower die body half 52 and a lip of the upper die body half. Optionally between lip 66 and preland portion 62 are preland extension 63 and a land 65 proximate lip 66. In this embodiment, a secondary preland region 68 is also present, between preland extension 63 and land 65. FIG. 5A provides a schematic illustration of the various parts of cavity 56 and their configuration, when lower die body half 52 and an upper die body half (in phantom) are combined.

Although not identified in FIG. 5, manifold 60 has a back line (see back line 32 of FIG. 1) and a preland back line 61 that is present between manifold 60 and preland portion 62. The back line of manifold 60 is not parallel with back edge 53 of die half 52, but rather, the back line of manifold 60 increases its distance from back edge 53 as it progresses laterally from inlet 58. From a different vantage point, the back line of manifold 60 is not parallel with die exit 64 of die half 52, but rather, the back line of manifold 60 decreases its distance from die exit 64 as it progresses laterally from inlet 58.

Manifold 60 extends as two arms, 60A, 60B from inlet end 59. Arms 60A, 60B extend to and terminate at terminus ends 69A, 69B, respectively. Terminus ends 69A, 69B extend to preland extension 63. In accordance with this invention, the width of arms 60A, 60B (the width being measured from the back line (see back line 32 of FIGS. 1 and 2) and preland back line 61) increases from the manifold centerline (see center line 33 of FIG. 2) to the outer ends (see ends 34, 36 of FIGS. 1 and 2).

In accordance with this invention, the width of the manifold arms increases from the centerline to the outer ends; the width increase may be linear or non-linear. Additionally, the back line of the manifold is not parallel with the back edge of the die, but rather, the distance from the back edge to the back line increases from the manifold centerline to its outer ends. In many embodiments of this invention, the manifold back line is curved or arcuate. Similarly, in many embodiments, the preland back line is curved or arcuate; the preland back line may define a deflector proximate inlet 59 that facilitates separation of the molten material between the two manifold arms. In some embodiments, the height of the manifold decreases from the manifold centerline to the outer ends.

Various examples of manifold shapes according to this invention are schematically depicted in FIGS. 6 through 9.

Figure 6:
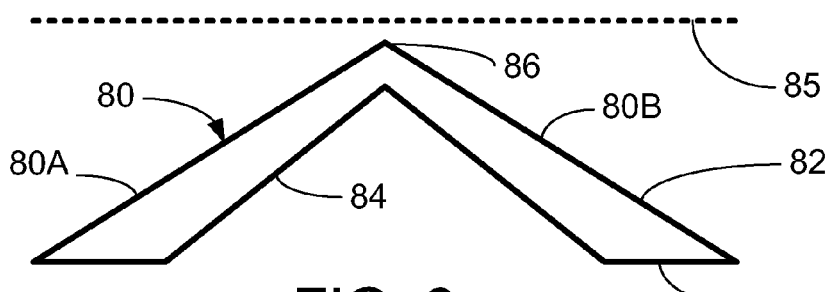
FIG. 6 is a schematic plan view of a generic embodiment of a manifold according to this invention.

FIG. 6 depicts a generic manifold 80 that has a back line 82 and a preland back line 84. For orientation reference, die back edge 85 is illustrated in phantom; the die exit (not illustrated) would be parallel to die back edge 85. Manifold has an inlet region 86 between arms 80A, 80B and a terminus end 88 for each arm 80A, 80B. A preland portion, not illustrated, would be present between arms 80A, 80B. Back line 82 is not parallel to but increases its distance from die edge 85 as it progresses from inlet region 86 to terminus end 88; similarly, back line 82 is not parallel to but decreases its distance to the die exit as it progresses from inlet region 86 to terminus end 88. In this embodiment, back line 82 is linear and preland back line 84 is linear. The width of manifold 80 (that is, of each arm 80A, 80B), which is the distance between back line 82 and preland back line 84 increases from inlet region 86 to terminus end 88.

Figure 7:
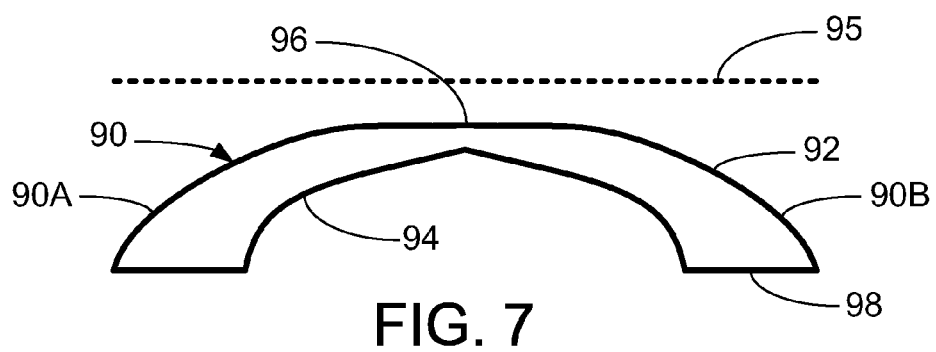
FIG. 7 is a schematic plan view of an alternate embodiment of a manifold according to this invention.

FIG. 7 illustrates a manifold 90 that has a back line 92 and a preland back line 94. For orientation reference, die back edge 95 is illustrated in phantom; the die exit (not illustrated) would be parallel to die back edge 95. Manifold 90 has an inlet region 96 between arms 90A, 90B and a terminus end 98 for each arm 90A, 90B. A preland portion, not illustrated, would be present between arms 90A, 90B. Back line 92 is generally not parallel to die edge 95 but for the most part, increases its distance from die edge 95 as it progresses from inlet region 96 to terminus end 98; in this particular embodiment, however, a portion of back line 92 at inlet region 96 is parallel or close to parallel with back edge 95. Similarly, back line 92 is generally not parallel to the die exit but for the most part decreases its distance from the die exit as it progresses from inlet region 96 to terminus end 98. This parallel portion of back line 92 is no more than about 25% of the entire back line 92, and in some embodiments, no more than about 15% or no more than about 10% of the entire back line 92. It is generally preferred that the back line of the manifold is not parallel to the die back edge or the die exit, but that the back line of the manifold increases its distance from the back edge as it progresses to the die exit. In this embodiment, the majority of back line 92 is curved or arcuate with no more than about 25% of back line 92 being linear and parallel to back edge 95. The arcuate or curved portion of back line 92 may be defined, for example, by a quadratic or cubic function. Preland back line 94 is curved or arcuate. The width of manifold 90 (that is, of each arm 90A, 90B) increases from inlet region 96 to terminus end 98.

Figure 8:
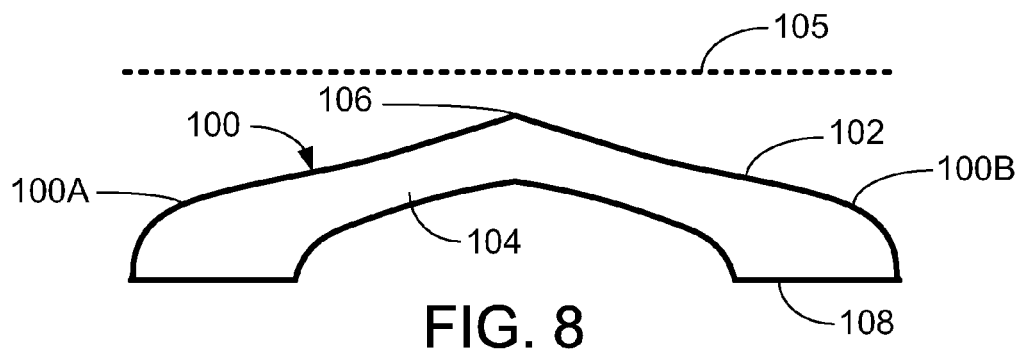
FIG. 8 is a schematic plan view of another alternate embodiment of a manifold according to this invention.

FIG. 8 illustrates a manifold 100 that has a back line 102 and a preland back line 104. For orientation reference, die back edge 105 is illustrated in phantom; the die exit (not illustrated) would be parallel to die back edge 105. Manifold 100 has an inlet region 106 between arms 100A, 100B and a terminus end 108 for each arm 100A, 100B. A preland portion, not illustrated, would be present between arms 100A, 100B. Back line 102 is not parallel to die edge 105 but increases its distance from die edge 105 as it progresses from inlet region 106 to terminus end 108; similarly, back line 102 is not parallel to but decreases its distance to the die exit as it progresses from inlet region 106 to terminus end 108. At least a portion of back line 102 is curved or arcuate; a portion of back line 102 is linear or nearly linear. Preland back line 104 is curved or arcuate. The curved or arcuate portions of either or both back line 102 and preland back line 104 may be defined by a quadratic, cubic, or other nonlinear function. The width of manifold 100 (that is, of each arm 100A, 100B) increases from inlet region 106 to terminus end 108.

Figure 9:
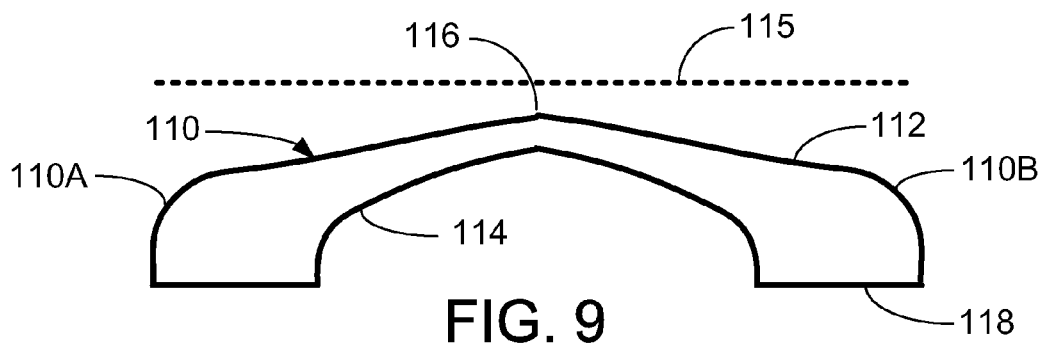
FIG. 9 is a schematic plan view of yet another alternate embodiment of a manifold according to this invention.

FIG. 9 illustrates a manifold 110 that has a back line 112 and a preland back line 114. For orientation reference, die back edge 115 is illustrated in phantom; the die exit (not illustrated) would be parallel to die back edge 115. Manifold 110 has an inlet region 116 between arms 110A, 110B and a terminus end 118 for each arm 110A, 110B. A preland portion, not illustrated, would be present between arms 110A, 110B. Back line 112 is not parallel to die edge 115 but increases its distance from die edge 115 as it progresses from inlet region 116 to terminus end 118; similarly, back line 112 is not parallel to but decreases its distance to the die exit as it progresses from inlet region 116 to terminus end 118. Back line 112 is curved or arcuate and preland back line 114 is curved or arcuate; either or both may be defined by a quadratic, cubic, or other nonlinear function. The width of manifold 110 (that is, of each arm 110A, 110B) increases from inlet region 116 to terminus end 118.

The manifolds of this invention, having the increasing width manifold arms, together with the preland portion, provide a constant shear rate at all areas of the cavity, and every fluid particle path through the cavity has the same residence time. Additionally, the die's balance is insensitive to viscosity changes, so the die can be used with essentially any extrudable molten material without having to reconfigure the die. By having the increasing width manifold arms and the constant shear rate, the preland portion length of the extrusion die is decreased, usually by about 30%, often about 40-60%, thus decreasing the clam-shelling effect and allowing design and extrusion of wider sheets than those extruded by a Winter die. Further, by having the increasing width manifold arms and the decreased length preland portion, the pressure drop through the die is decreased, due to the pressure drop being proportionate to the length of the preland portion.

Four exemplary extrusion dies according to this invention were designed. The various die and manifold parameters (e.g., coating width, exit gap, manifold widths, etc.) were selected and inputted into an extruder flow modeling program that was based on the research of H. H. Winter and H. G. Fritz, described in "Design of dies for the extrusion of sheets and annular parisons: the distribution problem", Polymer Engineering and Science, Vol. 26, No. 8 (April 1986) 543-553, which is incorporated herein by reference. However, the design equations for the Winter die were modified by replacing the constant manifold width with a manifold whose width was dependent upon the distance from the manifold centerline. Similar calculations were performed for two Winter die designs, where the design equations were returned to having a constant manifold width. The input parameters and results are provided in Table 1.

Example #4 to W#2, it can be seen that the preland length to obtain the same extrusion width was less for manifolds according to the present invention. Additionally, as the preland length decreased the pressure drop decreased and the maximum residence time decreased.

The manifold and preland designs of this invention, which provide extrusion dies having constant shear rate, may be used in various alternate extruder configurations that are well known. For example, the constant shear rate manifolds and prelands of this invention may be designed to further minimize the deflection of the die exit by providing the walls of the extrusion die with areas of increasing thickness, that increase from the die ends to a central location. The varying die wall thickness creates minimal deflection at the die exit. See, for example, U.S. Pat. No. 7,056,112 which describes an extrusion die having varying wall thickness. Additionally or alternatively, dies utilizing the manifolds and prelands of this invention may be nonplanar dies, to provide tubular or hollow extrusions. For example, dies utilizing the manifolds and prelands of this invention may be cylindrical extrusion dies. Additionally or alternatively, dies utilizing the manifolds and prelands of this invention may be used for multilayer extrusions. The designs of this invention, having a manifold with increasing width, can be used in generally any known extrusion die configuration to produce dies with constant shear rate, constant residence time, and/or decreased pressure drop through the die.

Thus, various embodiments and features of the CONSTANT SHEAR RATE EXTRUSION DIE are disclosed. The

TABLE 1

|  | #1 | #2 | #3 | W#1 | #4 | W#2 |
| --- | --- | --- | --- | --- | --- | --- |
| Die Design |  |  |  |  |  |  |
| Coating width (in) | 19 | 19 | 19 | 19 | 19 | 19 |
| Nominal gap (in) | 0.25 | 0.25 | 0.25 | 0.25 | 0.15 | 0.15 |
| Manifold width at center (in) | 2 | 2 | 2 | 2 | 1.5 | 1.5 |
| Manifold width at end (in) | 4 | 4 | 4 | 2 | 3.5 | 1.5 |
| Manifold control parameter | 1.8 | 1.2 | 1.4 | 1 | 1.3 | 1 |
| Entrance length (in) | 4 | 4 | 4 | 4 | 15 | 15 |
| Entrance diameter (in) | 2 | 2 | 2 | 2 | 1.25 | 1.25 |
| Polymer density | 1.45 | 1.45 | 1.45 | 1.45 | 1.45 | 1.45 |
| Through-put rate (lb/hr) | 3000 | 3000 | 3000 | 3000 | 290 | 290 |
| Die Flow Summary |  |  |  |  |  |  |
| Preland length (in) | 4.13 | 5.02 | 4.62 | 7.75 | 4.39 | 6.93 |
| Manifold height (in) | 0.545 | 0.545 | 0.545 | 0.545 | 0.377 | 0.377 |
| Total pressure drop (kPa) | 2117 | 2516 | 2333 | 3763 | 3429 | 4748 |
| Shear rate (/sec) | 122 | 122 | 122 | 122 | 33 | 33 |
| Exit velocity (in/sec) | 1.675 | 1.675 | 1.675 | 1.675 | 0.2698 | 0.2698 |
| Maximum residence time (sec) | 2.0 | 2.3 | 2.2 | 3.1 | 20.1 | 24.8 |
| Entrance pressure drop (kPa) | 252 | 252 | 252 | 252 | 1180 | 1180 |
| Entrance shear rate (/sec) | 28 | 28 | 28 | 28 | 11 | 11 |

For Examples #1, #2 and #3 the width of the manifold arms at the input region was 2 inches and increased 2 inches to 4 inches at the arm ends. For Winter die Example #1, the manifold arm width was constant at 2 inches. For Example #4 the manifold arm width at the input region was 1.5 inches and increased 2 inches to 3.5 inches at the arm ends. For Winter die Example #2, the manifold arm width was constant at 1.5 inches. By comparing Examples #1, #2 and #3 to W#1 and implementations described above and other implementations are within the scope of the following claims. One skilled in the art will appreciate that the various features described may be used in conjunction with any of the other features described herein above or other features other than those disclosed. The disclosed embodiments are presented for purposes of illustration and not limitation, and the present invention is limited only by the claims that follow.

What is claimed is:

1. An extrusion die comprising:
   a first body half and a second mating body half, which when mated together define a die inlet, a die exit, and a cavity in fluid communication with the die inlet and the die outlet, wherein the die cavity comprises:
   a manifold having a width defined by a back line and a preland back line, with no portion of the back line parallel to the die exit, the manifold having a rectangular cross-section perpendicular to the die exit and the width of the manifold increasing from the die inlet toward the die exit; and
   a preland portion between the preland back line and the die exit.

2. The extrusion die of claim 1, wherein at least a portion of the back line is arcuate.

3. The extrusion die of claim 2, wherein the back line is arcuate.

4. The extrusion die of claim 1, wherein the preland back line is arcuate.

5. The extrusion die of claim 1 wherein the manifold width increases linearly.

6. The extrusion die of claim 1 wherein the manifold width increases nonlinearly.

7. The extrusion die of claim 1, wherein the manifold has a height that decreases from the die inlet toward the die exit.

8. The extrusion die of claim 1, wherein the preland portion has a constant height between the preland back line and the die exit.

9. The extrusion die of claim 1, wherein the back line is nonlinear.

10. An extrusion die comprising:
    a first body half and a second mated body half having a die inlet, a die exit, and a cavity in fluid communication with the die inlet and the die outlet, wherein the die cavity comprises:
    a manifold having a centerline, a back line, a preland back line, and first and second arms each extending from the centerline to a terminus end, each manifold arm having a rectangular cross-section perpendicular to the die exit and a width defined by the back line and the preland back line, with the manifold back line nonlinear with no portion of the back line parallel to the die exit, the width of each manifold arm increasing from the centerline to its terminus end; and
    a preland portion between the preland back line and the die exit.

11. The extrusion die of claim 10, wherein at least a portion of the back line is arcuate.

12. The extrusion die of claim 11, wherein the back line is arcuate.

13. The extrusion die of claim 12, wherein the preland back line is arcuate.

14. The extrusion die of claim 10 wherein the width of each manifold arm increases linearly.

15. The extrusion die of claim 10 wherein the width of each manifold arm increases nonlinearly.

16. The extrusion die of claim 10, wherein the manifold has a height that decreases from the die inlet toward the die exit.

17. The extrusion die of claim 10, wherein the preland portion has a constant height between the preland back line and the die exit.

18. A method of extruding molten material, the method comprising:
    providing an extrusion die comprising a die inlet, a die exit, and a cavity in fluid communication with the die inlet and the die outlet, wherein the die cavity comprises a manifold having a centerline and first and second arms each extending from the centerline to a terminus end, each manifold arm having a rectangular cross-section perpendicular to the die exit, a backline with no portion parallel to the die exit, and a width increasing from the centerline to its terminus end, the die cavity further comprising a constant height preland portion between the manifold arms;
    inputting molten material via the inlet to the manifold, the molten material having a constant shear rate at each point through the die; and
    obtaining an extrudate from the die exit.

19. The method of claim 18, wherein inputting molten material via the inlet to the manifold further comprises inputting molten material via the inlet to the manifold, the molten material having a constant residence time within the die.

20. The method of claim 18 wherein providing an extrusion die comprises providing an extrusion die comprising a nonlinear backline defining the manifold arms.

21. An extrusion die comprising:
    a first body half and a second mating body half, which when mated together define a die inlet, a die exit, and a cavity in fluid communication with the die inlet and the die outlet, wherein the die cavity comprises:
    a manifold having a rectangular cross-section perpendicular to the die exit, a width defined by a manifold backline and a preland backline, with the manifold backline being nonlinear and no portion of the manifold backline being parallel to the die exit, the width of the manifold increasing from the die inlet toward the die exit; and a constant height preland portion between the preland backline and the die exit.

* * * * *